United States Patent
Cook et al.

[11] 3,869,700
[45] Mar. 4, 1975

[54] STORED VALUE SYSTEM

[75] Inventors: Kenneth Allen Cook, Pine Island; Townsend Henry Porter, Jr., Rochester, both of Minn.

[73] Assignee: International Business Machines Coporation, Armonk, N.Y.

[22] Filed: Dec. 26, 1972

[21] Appl. No.: 317,982

[52] U.S. Cl............................................. 340/149 A
[51] Int. Cl. ............................................. G06k 7/08
[58] Field of Search........... 340/149 R; 235/61.11 D

[56] References Cited
UNITED STATES PATENTS

| | | | |
|---|---|---|---|
| 3,349,369 | 10/1967 | Jensen | 235/61.11 D |
| 3,356,021 | 12/1967 | May et al. | 235/61.9 R |
| 3,513,298 | 5/1970 | Riddle et al. | 235/61.11 D |
| 3,560,715 | 2/1971 | Akamatsu et al. | 340/149 R |
| 3,715,569 | 2/1973 | Hicks et al. | 340/149 R |
| 3,740,530 | 6/1973 | Hoffer et al. | 340/149 R |
| 3,743,134 | 7/1973 | Constable et al. | 340/149 R |

*Primary Examiner*—Gareth D. Shaw
*Attorney, Agent, or Firm*—Robert W. Lahtinen

[57] ABSTRACT

Using documents that are encoded with a value that is decremented and re-encoded following a transaction, the security system of the present invention uses a security word which is encoded only at the time of issue and a data word that includes security information that may be compared with the non-reencoded security word with the result that a portion of the information is never re-encoded during use to permit a valid encoding of duplicate documents using the device normally used to read and re-encode the document.

6 Claims, 3 Drawing Figures

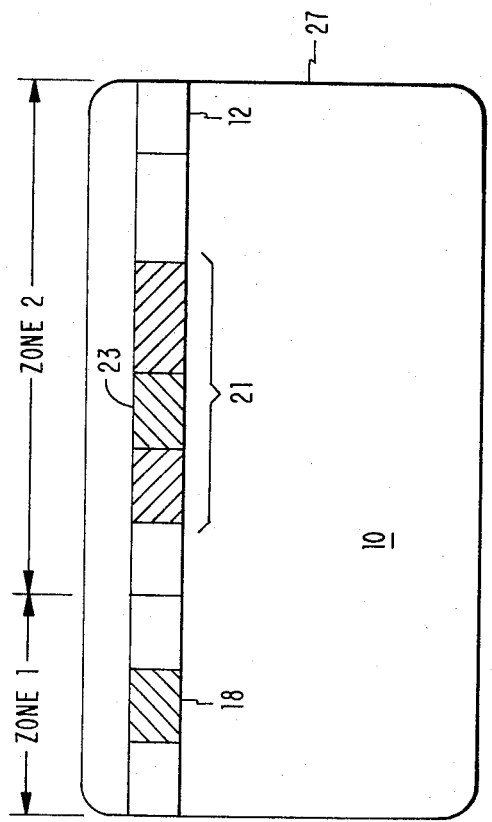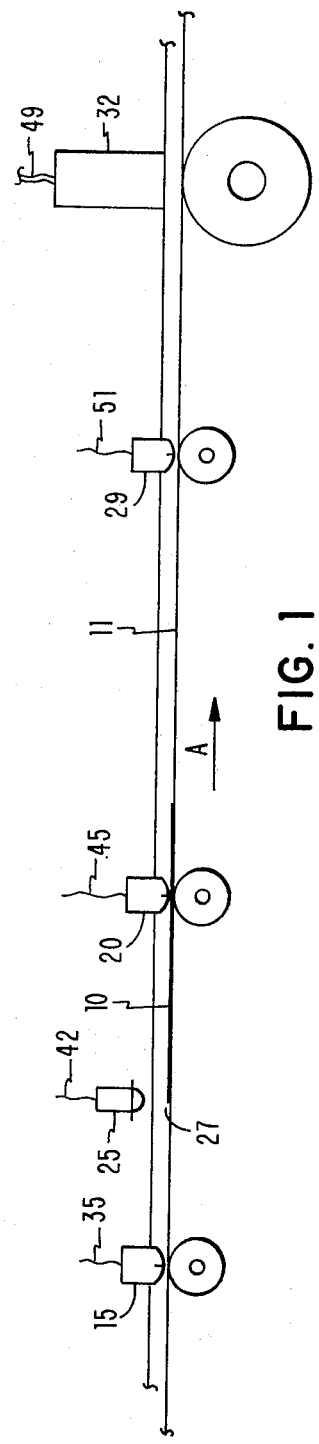
FIG. 3
FIG. 1

STORED VALUE SYSTEM

BACKGROUND OF THE INVENTION

The present invention relates to credit card handling system and more particularly to a stored value system for handling a stored value card of the type that has an encoded value that is decremented and re-encoded with a remaining balance.

An extension of the conventional credit card system which only identifies the holder and indicates credit worthiness is a card which is used to purchase goods or services by having an encoded value balance that is decremented upon completion of a sale or an exchange for other value received. The card thus becomes a monetary exchange media. Such a card must be rewritten or re-encoded to reflect a new balance or to impart new information necessary to a transaction.

Since it is necessary to successively re-encode the card in such a system, it is common to use a card having a magnetic stripe or other magnetic material applied thereto which can be indefinitely re-encoded in the same area. Although the use of the document with a magnetic stripe is pecularly adapted to this function there can be counterfeiting problems. The sensitivity of the magnetic system is such that it will read and encode through a layer of standard audio tape placed over the magnetic stripe. A single pass of the document through the system encodes both the tape overlay and the magnetic stripe on the document beneath. The tape overlay can then be removed and attached to a blank document of the same dimensions creating a second document equal in value to the original. To accomplish this, the only equipment required is the reading and encoding device that is used to record information or revalue the document.

In the system of the present invention, a stored value card is initially encoded with a security word on a first portion or zone of the magnetic stripe and a data word on a second zone or portion of the magnetic stripe. The data word includes a security word that corresponds or in some prescribed manner relates to the security word on the first portion to enable verification. The data word also contains a dollar amount or value balance and other information required for the environment in which the card is being used.

Upon issuance, the entire magnetic stripe on the card is encoded, but thereafter upon the occurrence of each transaction, the encoded information is read in its entirety, but only the data word is re-encoded to reflect updated information and/or decremented value as a transaction is completed. The omission of the security word during the re-encoding prevents the encoding of duplicate information by the expedient of a tape overlay. In addition, the use of security words having a large number of variations (for example, a twelve bit word provides 4096 unique security words) makes it highly unlikely that any one would be able to use the security word from a depleted document in conjunction with an overlay from a high value document to generate a useable counterfeit.

One environment in which the value balance type card may be used as a transit fare collection system. When entering, the card is validity checked and re-encoded with such information as entry station and time, following which a barrier is released to permit entry. When leaving, the card is inserted at an exit gate where validity is checked, fare computed, the value balance decremented in the amount of the fare, the ticket returned to the holder and the barrier opened. Since the system is used to accommodate a high traffic volume with unattended equipment, it is important to maintain the integrity of the credit media which has a cash value.

It is an object of the present invention to provide an improved credit system of the type having a document with an encoded value that is decremented in accordance with value received. It is a further object of this invention to provide a system using stored value cards wherein the device for re-encoding the decremented value cannot be utilized to duplicate and counterfeit such card containing a value balance or the encoding indicative thereof. These and other objects and advantages of the invention will be apparent from the following particular description of a preferred embodiment of the invention, as illustrated in the accompanying drawings.

BREIF DESCRIPTION OF THE DRAWINGS

FIG. 1 is a schematic view of a document path showing the sequence of read, encode, read and print means used in the system of the present invention.

FIG. 3 illustrates a stored value card including magnetic media suitable for use in the system of the invention.

DETAILED DESCRIPTION

Figure 2:
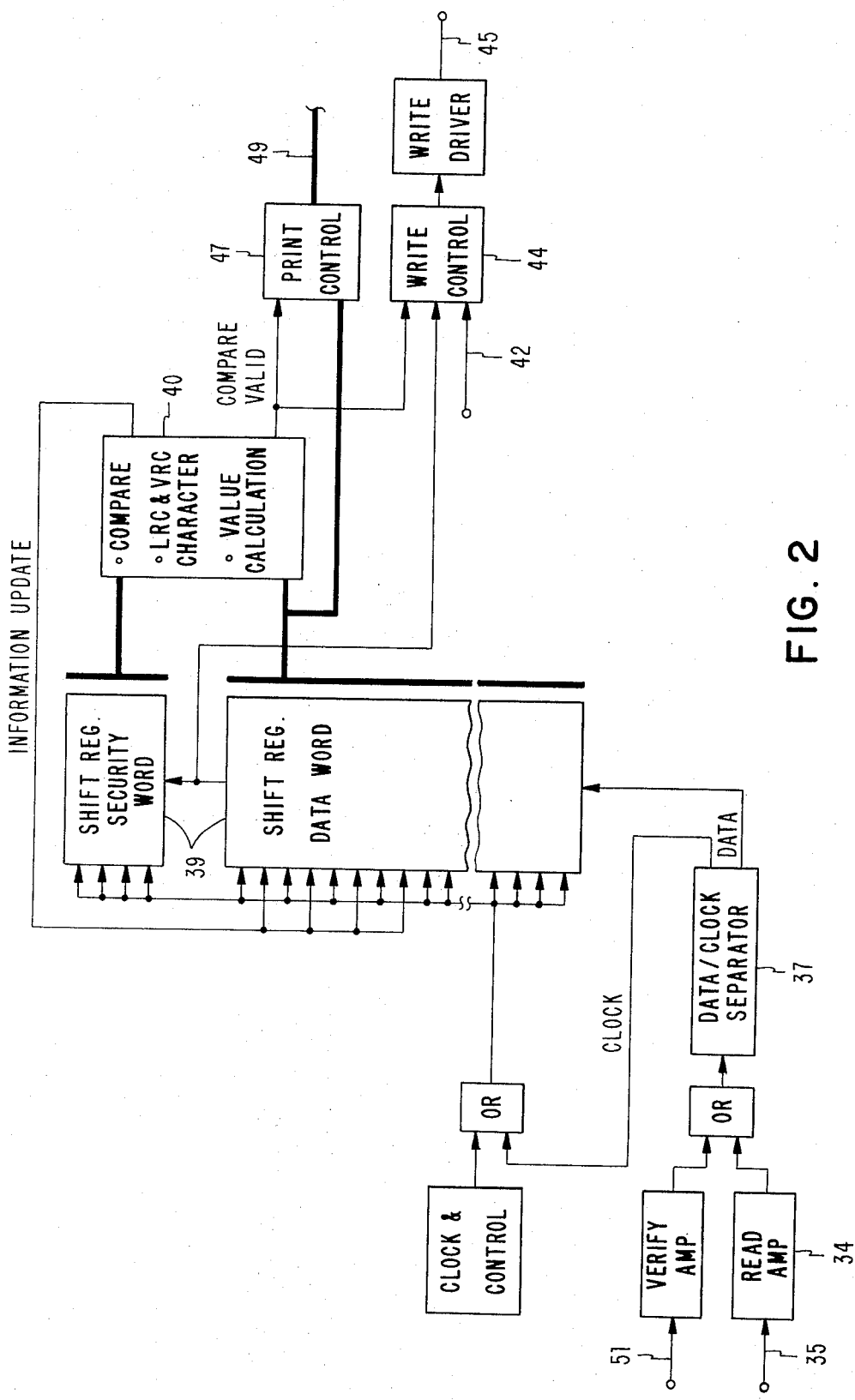
FIG. 2 is a schematic showing of circuit elements used in practicing the invention.

Referring to the drawings, FIG. 3 shows a stored value card 10 including a magnetizable layer of magnetic oxide 12 which extends the length of the document. One portion of the magnetic stripe 12 identified as zone one contains a security word 18 which is encoded at the time of issue, but is not subject to re-encoding by an encoding station 20 is shown on the document path 11 (FIG. 2) when the document is subsequently used. A second portion of the magnetic stripe 12 identified as zone 2 includes the data word 21 wherein is encoded information necessary for the credit system including the remaining value or credit balance. Nested within data word 21 is security information 23 for purposes of comparison. It will be appreciated that the security information nested in the data word could be either a duplication of the security word 18 of zone one or any other selected information which bears a predetermined correspondence to the security word 18 of zone one for purposes of comparison and verification.

FIG. 1 is a schematic showing of a portion of the document transport path of the device incorporating the present invention. This showing is for illustration of the present concept and does not include the drive rolls, incrementer rolls and the associated pressure rolls which control the movement of the card along the path. Also excluded is the input area and the structuring technique for rejecting cards that are not correctly oriented when inserted.

A card 10 travels along the document path 11 in the direction of arrow A. The magnetic encoding on the magnetizable layer or magnetic stripe 12 (FIG. 3) is read or sensed at a read station 15 and thereafter the data word information is updated at write or encode station 20. The write or encode cycle is started only after photo sensor 25 indicates that the trailing edge 27 of the document has passed. Thus, the document leading portion or zone one which contains the security word 18 has already passed the write station and is not re-encoded. Following write station 20 is another write station 29 which verifies the currently encoded information before passage of the document 10 to the print station 32 where selected updated information (such as the decremented remaining value of the ticket) is recorded when necessary.

Referring to FIG. 2, read amplifier 34 converts the analog signal received from read station 15 on line 35 to digital form. Read amplifier 34 feeds data/clock separator 37 where the clocking information is separated from the data, since data is recorded on the magnetizable media serially by bit and by character with clocking information interleaved. The data is shifted into shift register 39. When all the data has been read and shifted into the shift register, the LRC (longitudinal redundancy check) character generated during the read cycle is compared to the recorded LRC character in control unit 40 to test for data integrity. When this test is satisfied, the security word on the leading portion of the card is compared to the security word nested in the data word. If this latter compare is satisfied, the information field is updated and when a signal on line 42 indicates the document trailing edge 27 has reached photo sensor 25 write control 44 causes the updated data word to be shifted from shift register 39 on line 45 to encode station 20 and recorded on the document magnetic stripe 12 by re-encoding the updated data word in zone 2 of the document in substitution for the data word previously recorded. Thereafter, when document 10 passes under the verify sensing head 29, the encoded content of the magnetic stripe 12 including the re-encoded data word received on line 51 is shifted into the shift register 39 and checked by control unit 40 for proper LRC and VRC (Vertical Redundancy Check). A valid verify operation conditions print control 47 and transmits data to print station 32 on line 49 to print indicated information such as the updated value of the value balance where indicated to be printed on document 10. The document or card 10 is then returned to the holder at the end of document path 11.

While the invention has been particularly shown and described with reference to a preferred embodiment thereof, it will be understood by those skilled in the art that various changes in form and detail may be made therein without departing from the spirit and scope of the invention.

What is claimed is:

1. A stored value system comprising
   a stored value card with a magnetizable layer on which digital signals are encoded on first and second portions and whereon said digital signals store a value balance,
   said first portion having a security word encoded thereon and said second portion having a data word, including security data with a predetermined correspondence to said security word and said value balance, encoded thereon;
   a device for processing said stored value card and including a document path along which said card is transported;
   sensing means positioned adjacent said document path for sensing data encoded on said magnetizable layer;
   compare means for comparing said security word encoded in said first portion with said security data encoded in said second portion to test for the presence of said predetermined correspondence;
   encoding means positioned adjacent said document path subsequent to said sensing means for reencoding digital signals on said magnetizable layer when said test indicates the presence of said predetermined correspondence between said security words; and
   control means for limiting operation of said encoding means to the period during which said magnetizable layer second portion progresses past said encoding means.

2. The stored value system of claim 1 wherein said magnetizable layer comprises a stripe of magnetic material longitudinally extending along the surface of said stored value card in the direction of card travel past said sensing means and said encoding means.

3. The stored value system of claim 2 wherein said control means comprises actuating means for initiating operation of said encoding means when said first portion of said stored value card has passed said encoding means.

4. The stored value system of claim 3 further comprising printer means adjacent said document path subsequent to said encoding means for printing the amount of said value balance on said stored value card in human readable form.

5. The stored value system of claim 4 further comprising second sensing means adjacent said document path intermediate said encoding means and said print means for sensing encoded information on said magnetic stripe and verification means for verifying the correctness of information sensed by said second sensing means.

6. The stored value system of claim 5 wherein said security data word in said first portion is identical to said security word and nested within said data word in said second portion.

* * * * *